W. G. COLLINS,

Assignor, by mesne assignments, to T. V. ALLIS.

Barbed-Fence.

No. 9,211. Reissued May 25, 1880.

Witnesses:

Charles R. Searle

W. J. Morgan

Inventor:

Wm. G. Collins

By A. R. Shaver

Attorney.

N. PETERS, PHOTO-LITHOGRAPHER, WASHINGTON, D. C.

UNITED STATES PATENT OFFICE.

WILLIAM G. COLLINS, OF OLEAN, NEW YORK, ASSIGNOR, BY MESNE ASSIGNMENTS, TO THOMAS V. ALLIS, OF NEW YORK CITY.

BARBED FENCE.

SPECIFICATION forming part of Reissued Letters Patent No. 9,211, dated May 25, 1880.

Original No. 173,271, dated February 8, 1876. Application for reissue filed March 20, 1880.

*To all whom it may concern:*

Be it known that I, WILLIAM G. COLLINS, of Olean, in the county of Cattaraugus and State of New York, have invented certain Improvements in Barbed Fences, of which the following is a specification.

This invention consists of a barbed rod for fences, constructed of a ribbed rod having the barbs formed thereon out of said ribs.

Figure 1:
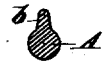
Figure 2:
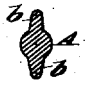
Figure 3:
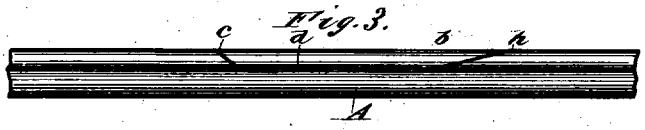
Figure 4:
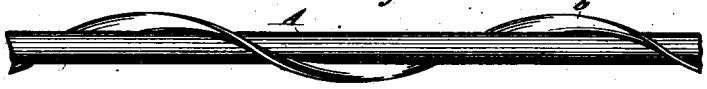
Figure 5:
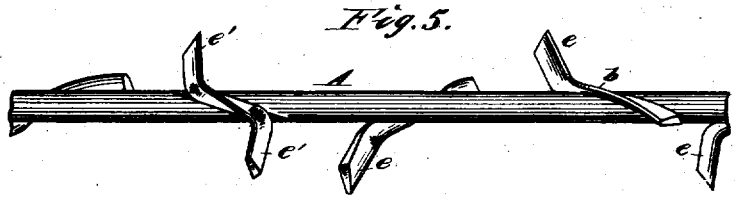
Figure 6:
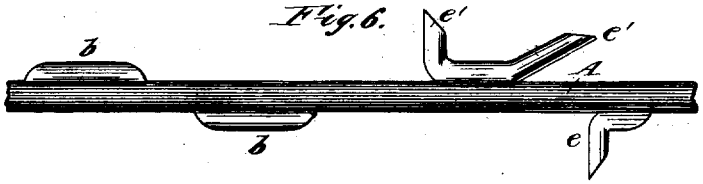

Figures 1 and 2 represent cross-sections of the ribbed rod. Fig. 3 is a plan view of the same, made as shown in Fig. 1. Fig. 4 represents the ribbed rod after it has been twisted. Fig. 5 shows the same with the barbs completed thereon, and Fig. 6 shows the same in a modified form.

Of late it has become customary to make fences of wires, one or more of which is provided with a series of barbs or points, intended to operate the same as thorns on hedges in turning cattle and other stock; but as made these fences are composed of wires having the barbs or points secured thereon by twisting, riveting, &c., which renders the making of the wire both tedious and expensive, and it is difficult to secure the barbs upon a round wire in such a manner as to have them retain their position.

The object of my invention is to produce a barbed rod having the barbs made solid thereon by cutting them from one or more ribs previously formed on the rod for that purpose, and to so construct it that the whole operation may be performed by machinery, thereby greatly expediting and cheapening the manufacture of the article.

To do this I first construct a ribbed rod—that is, a rod having one or more laterally-projecting ribs, *b*, as represented in Figs. 1 and 2, the former showing it with one rib and the latter with two.

These ribbed rods may be made by drawing them through dies of the required form, or by rolling them with properly-grooved rolls, though I propose to use a machine which will both form the ribs and cut the barbs all at one operation; but as said machine will form the subject of a separate application, it need not be further described herein.

After having thus made the ribbed rod, the barbs *e* are formed thereon by cutting the ribs transversely on a slant, as shown at *c*, Fig. 3, and longitudinally a distance equal to the length of the intended barb, as shown at *d*, Fig. 3, after which the loose portion is bent outward at any desired angle, thus forming a series of points or barbs, *e*, as shown in Fig. 5; or, if preferred, a single cut may be made in the rib, as shown at *h*, Fig. 3, and the end or point be bent outward, the only difference being in the shape of the barb thus formed.

In case it be desired to form the barbs on ribbed rods after the latter have been separately manufactured, it may be done by passing the rods through rolls provided with cutting-blades arranged at suitable angles and intervals, or by means of reciprocating cutters, in a manner readily understood by those skilled in the art.

If the barbs be formed on a straight rod, like that shown in Fig. 3, it is obvious that the barbs will stand in a single row along one side, or if the rod be made with two ribs, as shown in Fig. 2, they will stand in two straight rows; but by twisting the rods, as shown in Fig. 4, they may be made to project from the rods on all sides. The rod may be thus twisted before or after the barbs are cut; but it is better to twist it afterward, for the reason that it is less difficult to make the cuts on a straight rod than on one that has been twisted, and also because the twisting of the rods after the cuts have been made will of itself throw the points out more or less.

In Fig. 6 I have represented a modification in which the ribs, instead of being continuous, are formed at intervals only, the object being to save metal. These short ribs are to be cut longitudinally at one or both ends and bent out to form the barbs. By cutting them at both ends and leaving a central portion uncut two barbs may be formed from each rib, as shown at *e'*, Figs. 4 and 5.

It will be seen that by this plan I am enabled to produce a barbed rod having the barbs formed solid thereon without weakening the body of the rod itself, the latter being left of the full size at the intervening points or spaces, and of the full size that an ordinary or plain rod of the same diameter would be. Moreover, the body of the rod is left of a circular form, or nearly so, thus making it much stronger than it would be if the barbs were cut from the rod itself, and also leaving it in the best form to resist strain, oxidation, &c.

I am aware that it has been proposed to make a barbed fence by using band-iron having its edges cut to form barbs. I am also aware that it has been proposed to make a barbed wire with the barbs standing at right angles from the body of the wire, and to be thus made in the operation of forming the wire itself by forging, and I do not claim either of these as my invention; but What I do claim is—

A barbed rod for fences, having the barbs made thereon from one or more ribs or fins on the side or sides of the rods integral therewith, substantially as described.

WM. G. COLLINS.

Witnesses:
GEO. A. STURGEON,
CHARLES H. RICHARDS.